(12) United States Patent
Masuda

(10) Patent No.: US 9,044,835 B2
(45) Date of Patent: Jun. 2, 2015

(54) GAS CONTAINER VALVE FASTENING MACHINE

(75) Inventor: Eiji Masuda, Nara (JP)

(73) Assignee: FLOWM CO., LTD., Osaka (JP)

( * ) Notice: Subject to any disclaimer, the term of this patent is extended or adjusted under 35 U.S.C. 154(b) by 663 days.

(21) Appl. No.: 13/343,008

(22) Filed: Jan. 4, 2012

(65) Prior Publication Data

US 2012/0192408 A1 Aug. 2, 2012

(30) Foreign Application Priority Data

Jan. 27, 2011 (JP) .................................. 2011-014662

(51) Int. Cl.
*B23P 21/00* (2006.01)
*B23P 19/06* (2006.01)
*F17C 13/04* (2006.01)

(52) U.S. Cl.
CPC .......... *B23P 19/065* (2013.01); *Y10T 29/53022* (2015.01); *F17C 13/04* (2013.01)

(58) Field of Classification Search
CPC ........ F17C 13/04; B23P 19/00; B23P 19/065; H05K 13/0413; H01K 43/20
USPC ............................................ 29/709, 700, 776
See application file for complete search history.

(56) References Cited

U.S. PATENT DOCUMENTS 3,708,854 A * 1/1973 Nalbach .......................... 29/809

FOREIGN PATENT DOCUMENTS

JP 2813765 8/1998

* cited by examiner

*Primary Examiner* — Moshe Wilensky
(74) *Attorney, Agent, or Firm* — Fitch, Even, Tabin & Flannery LLP

(57) ABSTRACT

The invention is a gas container valve fastening machine which comprises a column erected on a base, a clamp unit for securely supporting a gas container placed on the base in an upright posture parallel to the column, a rotary drive unit vertically movably disposed above clamp the unit along the column, a rotary transmission unit interlocked and connected to an output shaft of the rotary drive unit, and a wrench attached to a lower end of the rotary transmission unit. A valve engaged in the wrench is rotated by the rotary transmission unit and threaded into the screw hole of a sleeve of the gas container, including a guide rod arranged parallel to the column, and a movable frame with its middle portion attached to the guide rod to be free to move in the axial direction, and free to rotate in the circumferential direction via a bearing boss.

1 Claim, 6 Drawing Sheets

GAS CONTAINER VALVE FASTENING MACHINE

The present application claims priority to Japanese application JP 2011-014662 filed Jan. 27, 2011.

FIELD OF THE INVENTION

The present invention relates to a valve fastening machine used for threading a valve into a screw hole of a sleeve of a gas container such as a high-pressure gas container.

BACKGROUND ART

Conventionally employed for installing this type of valve is a gas container valve fastening machine which comprises a column erected on a base, a clamp unit for securely supporting a gas container placed on the base in an upright posture parallel to the column, a rotary drive unit vertically movably disposed above the clamp unit along the column, a rotary transmission unit interlocked and connected to an output shaft of the rotary drive unit, and a wrench attached to a lower end of the rotary transmission unit, wherein a valve engaged in the wrench is rotated by the rotary drive unit and threaded into a screw hole formed in a sleeve of the gas container.

When the male screw portion of the valve is threaded into a screw hole of a sleeve of the gas container main body by using such a conventional valve fastening machine, the valve moves in the axial direction just by one pitch of the screw thread every turn of the male screw portion of the valve, but in case the valve is unable to smoothly move in the axial direction due to frictional forces between the valve and the wrench, there arises such a problem that the male screw portion of the valve or the screw thread of the sleeve is damaged by surface pressures generated at one side of the screw thread engaged therewith or gas leakage trouble resulting in defective fastening due to a gap formed at the other side of the screw thread.

In order to solve such a problem caused due to defective fastening, a valve fastening machine is proposed in Patent document 1 (Japanese Patent Publication No. 2813765), which is configured in that the output shaft of a rotary drive unit used for turning a wrench is connected to a transmission member with a wrench attached thereto in such a manner as to be unable to rotate individually and free to move in the axial direction, and also there is provided a spring which presses the transmission member against the output shaft with a predetermined pressure.

SUMMARY OF THE INVENTION

Problems to be Solved by the Invention

However, in the case of the valve fastening machine disclosed in the Patent document 1, the connecting device for connecting the output shaft to the transmission member via the spring in such a manner as to be unable to rotate individually and free to move in the axial direction is disposed directly under the output shaft, and therefore, it is necessary to make the connecting device structurally as small as possible in order to avoid causing hindrance to the fastening operation, and there is a problem such that forcible deformation of the structure easily takes place. Also, since the reduction of frictional forces generated on fastening surfaces between the wrench and the valve corresponds to the proportion of the distance between the fastening surfaces and the outer diameter of the connecting device, the outer diameter of the connecting device cannot be sufficiently increased, and as a result, the axial direction resistance of the valve due to frictional forces between the valve and the wrench is not sufficiently decreased. Accordingly, it is not enough to solve the problem of defective fastening described above.

The object of the present invention is to provide a gas container valve fastening machine which is capable of effectively preventing screw thread from being damaged due to defective fastening or occurrence of gas leakage trouble by greatly reducing the axial resistance of the wrench against the axial valve movement generated due to friction between the valve and the wrench when the male screw portion of a valve is threaded into the screw hole of a sleeve of the gas container.

Means to Solve the Problems

In order to solve the above problem, the present invention is configured as described in the following.

The invention of claim 1 is a gas container valve fastening machine, comprising a column erected on a base, a clamp unit for securely supporting a gas container placed on the base in an upright posture parallel to the column, a rotary drive unit vertically movably disposed above the clamp unit along the column, a rotary transmission unit interlocked and connected to an output shaft of the rotary drive unit, and a wrench attached to a lower end of the rotary transmission unit, wherein a valve engaged in the wrench is rotated by the rotary transmission unit and threaded into a screw hole of a sleeve of the gas container, and also included is a guide rod arranged parallel to the column and a movable frame with its middle portion attached to the guide rod in such a manner as to be free to move in the axial direction and free to rotate in the circumferential direction via a bearing boss, and the rotary drive unit is secured to one side end of the movable frame, and also, a load cell for detecting fastening torque of the wrench is attached to the other side end so as to operate in the direction of being pressed against the side surface of the column.

The invention of claim 2 is configured in that the side end of the movable frame to which the load cell is attached includes two arms disposed in such a manner as to hold the column from both sides, and the load cell is fixed at the end of one arm, and the load housing of the load cell is installed via screw fastening reaction force receiving rollers disposed at upper and lower sides of the load cell, and a screw loosening reaction force receiving roller is installed at the end of the other arm.

Effect of the Invention

As described above, a gas container valve fastening machine of the present invention includes a movable frame with its middle portion attached to a guide rod disposed parallel to a column in such a manner as to be free to move in the axial direction and free to rotate in the circumferential direction via a bearing boss, wherein a rotary drive unit is fixed at one end of the movable frame, and also, a load cell for detecting the fastening torque of the wrench is attached to the other end so as to operate in the direction of being pressed against the side surface of the column, and the reaction farce of fastening torque of the wrench is received by the side surface of the column, therefore it becomes possible to set longer the active distance of reaction force of the fastening torque, that is, the distance up to the action point of the load cell about the guide rod, and when the male screw portion of a valve is engaged and fastened by a wrench into the screw hole of a sleeve of the gas container, the axial resistance of the wrench against the axial movement of the valve can be greatly reduced. Accordingly, the wrench smoothly follows the axial movement of the valve in fastening operation and moves along with the valve, thereby performing normal fastening, and it is possible to effectively prevent the occurrence of damage to the screw thread engaged and gas leakage caused due to defective fastening.

Particularly, according to the invention of claim 2, since the reaction force of fastening torque is received by rolling contact via rollers, the axial resistance of the wrench against the axial movement of the valve can be further reduced, and the wrench smoothly follows the valve movement almost without resistance in the axial direction and it is possible to further effectively prevent problems caused due to defective fastening.

BRIEF DESCRIPTION OF THE DRAWINGS

FIG. 7 is an explanatory diagram of the arrangement for the column where a load cell is installed.

DESCRIPTION OF THE PREFERRED EMBODIMENTS

The preferred embodiments of the present invention will be described in the following with reference to the drawings.

Figure 1:
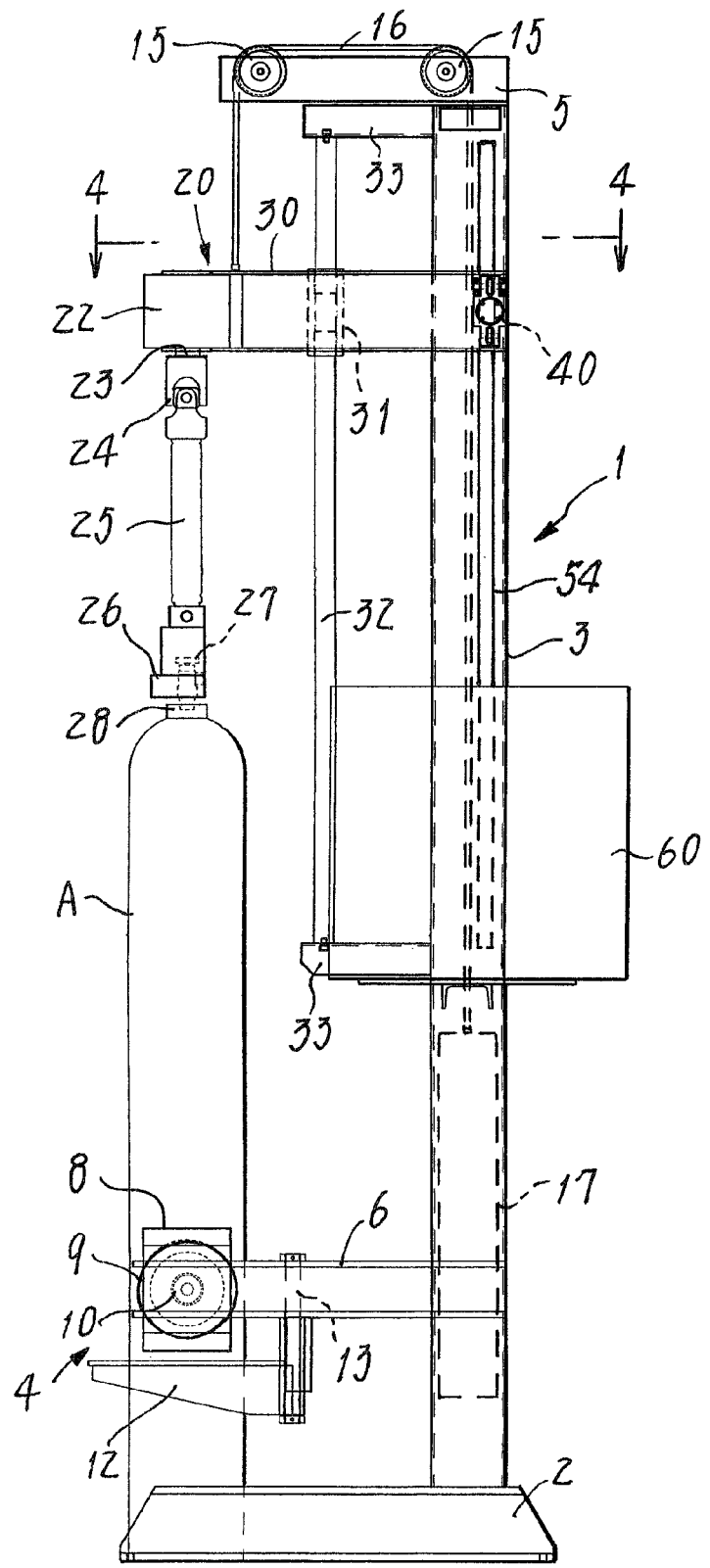
FIG. 1 is a front view of a gas container valve fastening machine of the present invention.
Figure 2:
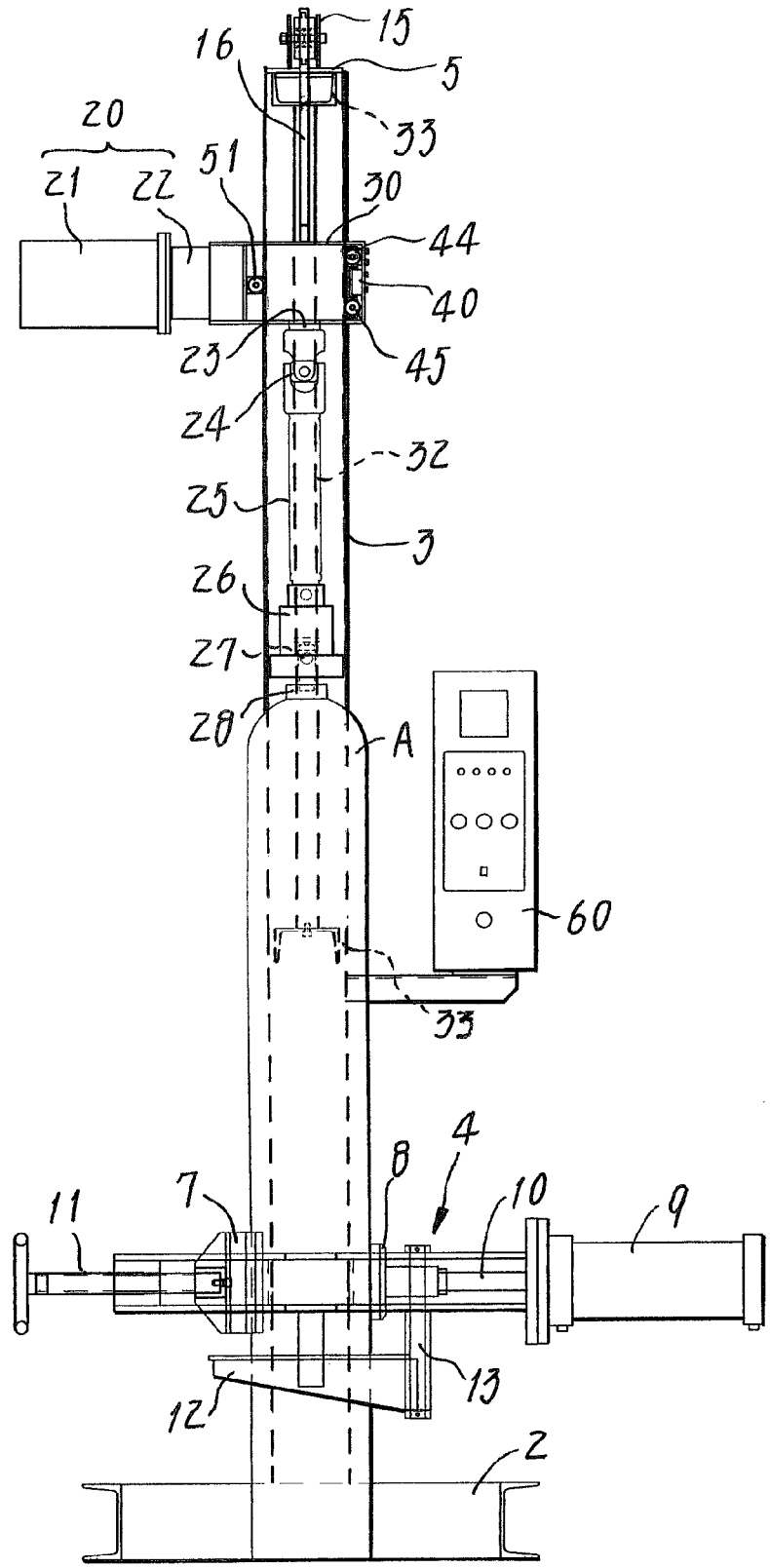
FIG. 2 is a side view of the gas container valve fastening machine.

FIG. 1 and FIG. 2 show an example of a gas container valve fastening machine of the present invention. The valve fastening machine 1 includes square column 3 erected at one end of base 2, and is provided with clamp unit 4 which securely supports high pressure gas container (hereinafter called gas container) A placed on base 2 at the bottom of column 3 in an upright fashion parallel to column 3. Also, at the upper end of column 3, there is provided mount 5 which is laterally protruded, suspending rotary drive unit 20 for driving the wrench described later and supporting it in a vertically movable fashion.

Clamp unit 4 comprises > shaped (in plane view) frame 6 secured on column 3, and reference fixing pad 7 and retaining pad 8 opposing to each other are disposed on frame 6. Retaining pad 8 is fitted to piston rod 10 of fixing air cylinder 9 secured on frame 6, which is free to move close to and apart from reference fixing pad 7. The fixing position of reference fixing pad 7 can be adjusted by adjusting screw 11 (see FIG. 2) in accordance with the diameter of gas container A. Also, small container base 12 is attached to frame 6 via swing shaft 13 in such a manner as to be movable to the right and left.

Figure 3:
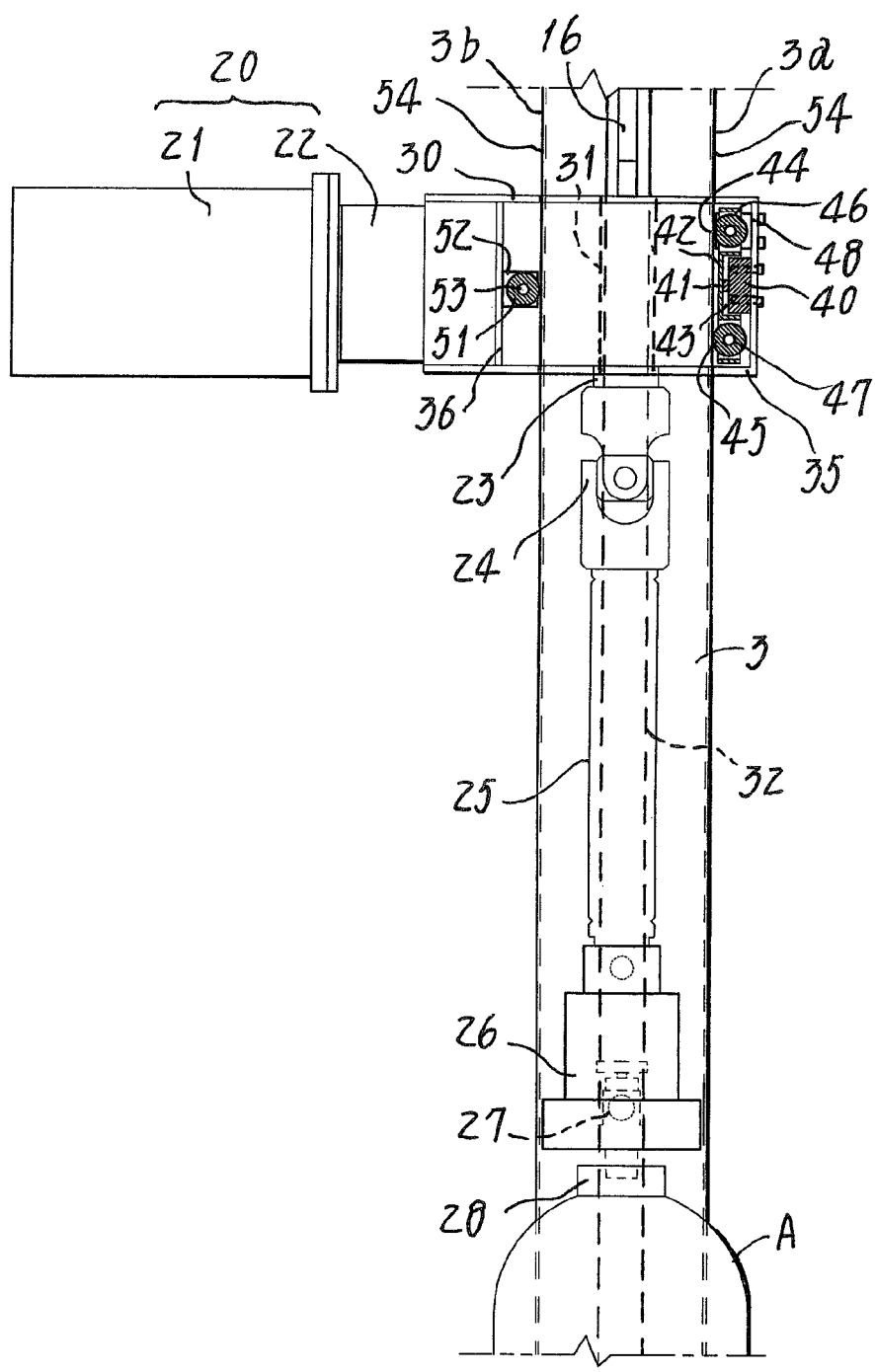
FIG. 3 is an enlarged sectional view of an essential portion of FIG. 2.

Rotary drive unit 20 comprises motor 21 and speed reducer 22 (see FIG. 2 and FIG. 3). Rotary transmission shaft 25 is interlocked and connected to output shaft 23 of speed reducer 22 via universal joint 24. The rotary transmission shaft 25 droops parallel to column 3, and wrench 26 is attached to the lower end thereof. Rotary drive unit 20 is securely supported by securing speed reducer 22 at one side end of movable frame 30 described later, and also, with movable frame 30 connected to one end of chain 16 disposed over a pair of sprockets 15, 15 rotatably attached to either end of mount 5, it is suspended so as to be vertically movable along column 3 together with movable frame 30. The other end of chain 16 is connected to balance weight 17 housed in a hollow cavity of column 3, and the weight of balance weight 17 is balanced with the total weight of rotary drive unit 20 and movable frame 30 so that rotary drive unit 20 and movable frame 30 can smoothly move up and down along column 3 in unison with slight forces.

Movable frame 30 has a hollow, rectangular cubic structure, and the middle portion is attached to guide rod 32 disposed parallel to column 3 via cylindrical bearing boss 31 in such a manner as to be vertically (axially) movable and peripherally rotatable. Guide rod 32 is arranged parallel to column 3 at the middle position between column 3 and rotary transmission shaft 25, and also, both ends of the rod are secured on column 3 and securely connected to support arms 33, 33 protruding sideways. And, as clearly shown in FIG. 4, with speed reducer 22 securely connected to one side end of movable frame 30 by using bolt 34, rotary drive unit 20 is securely supported on movable frame 30. Also, the other side end of movable frame 30 is formed in U-shape having two arms 35, 36 disposed in such manner as to hold both side surfaces 3a, 3b of column 3 from both sides so that the fastening torque of wrench 26 is received by the side surfaces of column 3 as described later.

Figure 5:
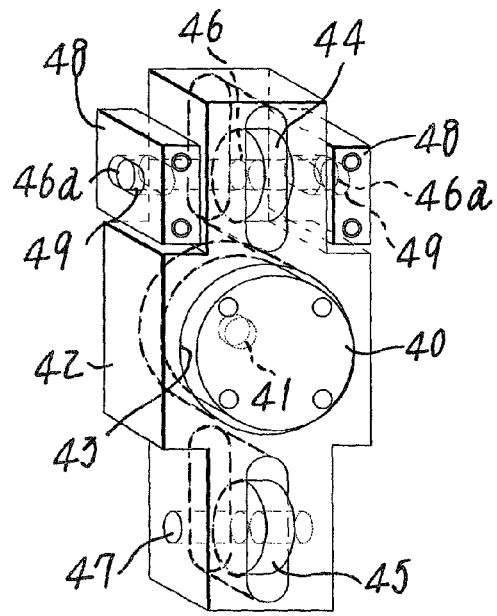
FIG. 5 is a perspective view of the portion where a load cell is installed.
Figure 6:
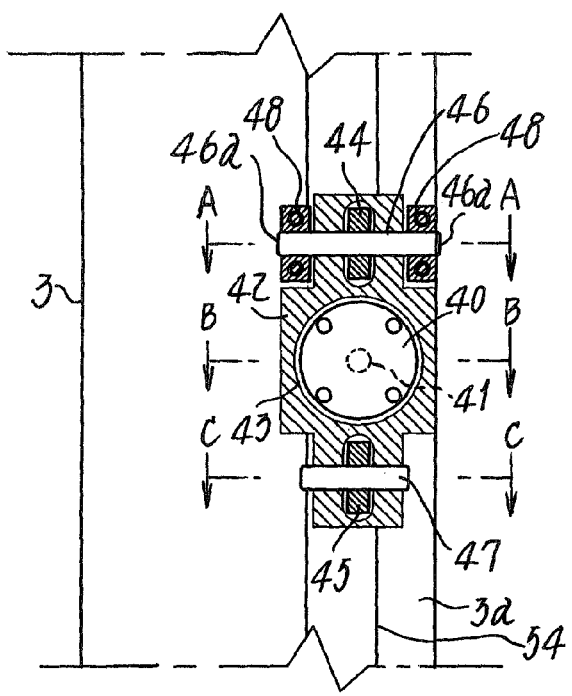
FIG. 6 is a longitudinal sectional view of an essential portion where a load cell is installed.
Figure 7A:
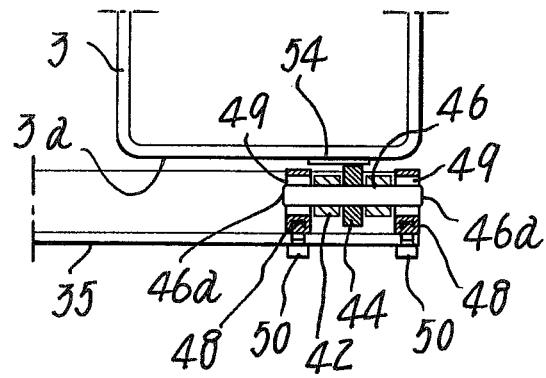
FIG. 7(a) is a sectional view of the portion arrow-marked along the A-A line of FIG. 5.
Figure 7B:
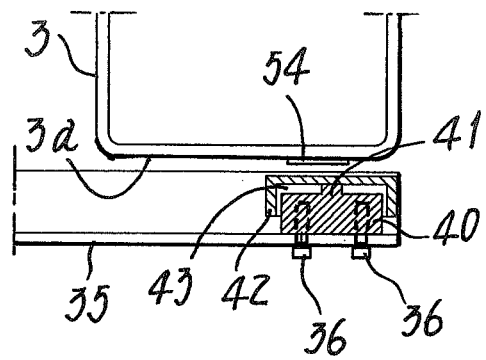
FIG. 7(b) is a sectional view of the portion arrow-marked along the B-B line of FIG. 5.
Figure 7C:
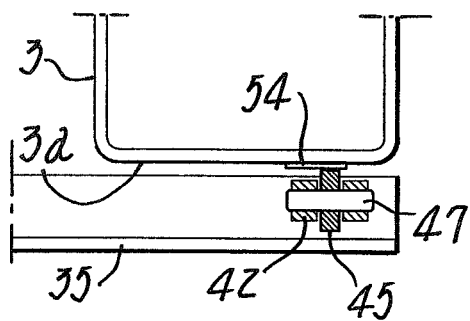
FIG. 7(c) is a sectional view of the portion arrow-marked along the C-C line of FIG. 5.

Load cell 40 for detecting the fastening torque of wrench 26 is attached to the end of one arm 35 (see FIG. 5 to FIG. 7). The load cell 40 is, as shown in FIG. 7(b), housed in space 43 disposed in the middle of load housing 42 in a state of being secured on arm 35 by means of setscrew 36, and protrusion 41 thereof abuts on the inner bottom surface of space 43. And, as shown in FIG. 5 and FIG. 6, a pair of screw fastening reaction force receiving rollers 44, 45 is rotatably attached to either end of load housing 42 via support shafts 46, 47. One support shaft 46 is longer than the other support shaft 47, and both ends 46a, 46a of support shaft 46 are inserted into slotted holes 49, 49 disposed in support parts 48, 48 secured on the end of arm 35 by means of screw 50, which are supported in a free-to move fashion within the range of slotted holes 49, 49. Accordingly, load housing 42 is slidably supported by support parts 48, 48 via support shaft 47, and comes in contact with side surface 3a of column 3 via rollers 44, 45.

Figure 4:
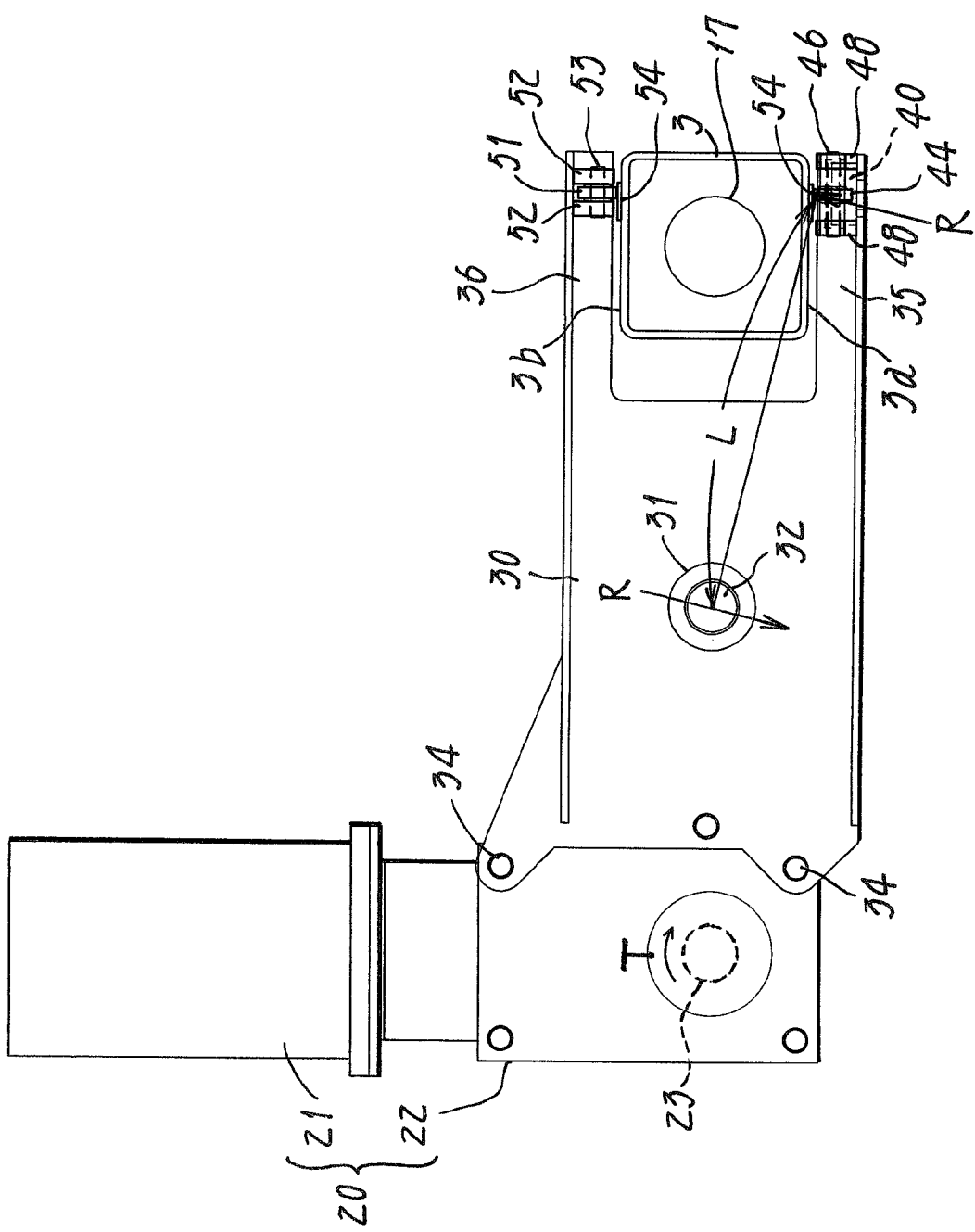
FIG. 4 is an enlarged view of the portion arrow-marked along the 4-4 line of FIG. 1.

Also, as shown in FIG. 3 and FIG. 4, at the end of the other arm 36, screw loosening reaction force receiving roller 51 is rotatably attached to support part 52 secured by setscrew (not shown) via support shaft 53.

Thus, movable frame 30 with rollers 44, 45 and 51 fitted to both arms 35, 36 comes into sliding engagement with longitudinally extending slide plate 54 with a pair of rollers 44, 45 fitted to one side surface 3a of column 3, and also, comes into sliding engagement with longitudinally extending slide plate 54 with the other roller 51 fitted to side surface 3b of column 3, and thereby, it is installed in a vertically (axially) free-to-move fashion on column 3 in such a manner as to hold both side surfaces 3a, 3b of column 3 between both arms 35, 36. And, rollers 44, 45 on one side function as rollers for receiving reaction of the valve screw fastened by wrench 26, and roller 51 on the other side functions as a roller for receiving reaction of the valve screw loosened. Incidentally, reference numeral 60 is a control panel.

The operation for engaging and fitting the male screw of valve 27 into screw hole of sleeve 28 of gas container A by using the valve fastening machine 1 of the present invention having the configuration described above will be described in the following.

Firstly, gas container A placed on base 2 is held between reference fixing pad 7 and retaining pad 8 of clamp unit 4 and is securely supported in an upright fashion parallel to column 3. Subsequently, valve 27 is engaged in wrench 26, and rotary drive unit 20 is shifted down together with movable frame 30 until valve 27 abuts on sleeve 28 of gas container A. In this condition, rotary drive unit 20 is operated, and wrench 26 is turned in the fastening direction by rotary transmission shaft 25, then the male screw portion of valve 27 is engaged in the screw hole of sleeve 28, and thereby, valve 27 is installed in gas container A. As the valve 27 is turned and fastened, valve 27 smoothly moves in the axial direction in a state of engaging the wrench 26, and thereby, the fastening operation is normally performed. In this case, as shown in FIG. 4, reaction R of fastening torque T generated by wrench 26 acts on the end portion of arm 35 fitted to load cell 40 of movable frame 30 about guide rod 32 and is received by side surface 3a of column 3 via rollers 44, 45 in a rolling contact fashion. Fastening torque T becomes equal to the product of reaction R and reaction R acting distance, that is, distance L up to the action point of load cell 40 about guide rod 32, which is represented by T=RL. Accordingly, reaction R can be reduced by setting distance L longer. On the other hand, axial resistance force S caused by friction between the fastening surfaces of wrench 26 and valve 27 due to reaction R can be represented by S=ΣμR, and therefore, axial resistance force S can be greatly reduced by setting R smaller and by setting friction coefficient μ smaller with respect to the rolling friction of rollers 44, 45. Accordingly, the axial resistance of wrench 26 as against the axial movement of valve 27 in valve fastening operation can be greatly reduced, and wrench 26 smoothly moves along the movement of valve 27, performing the normal fastening operation, and it is possible to effectively prevent the occurrence of damage to thread-engaged screws or gas leakage trouble due to defective fastening described above.

And, when an appropriate fastening torque is detected by load cell 40, rotary drive unit 20 stops rotating, and fastening of valve 27 is then completed. Subsequently, rotary drive unit 20 moves up together with movable frame 30 and releases wrench 26 from valve 27.

DESCRIPTION OF THE REFERENCE NUMERALS AND SIGNS

1 Valve fastening machine
2 Base
3 Column
3a, 3b Both side surfaces of column 3
4 Clamp unit
5 Mount
20 Rotary drive unit
21 Motor
22 Speed reducer
23 Output shaft
24 Universal joint
25 Rotary transmission shaft
26 Wrench
27 Valve
30 Movable frame
31 Bearing boss
32 Guide rod
33 Support arm
35, 36 Arm of movable frame 30
40 Load cell
41 Protrusion of load cell 40
42 Load housing
43 Space
44, 45 Screw fastening reaction force receiving roller
46, 47 Support shaft
46a, 46a Both ends of support shaft 46
48 Support part
49 Slotted hole
51 Screw loosening reaction force receiving roller
52 Support part
53 Support shaft
60 Control panel

PRIOR ART DOCUMENT

Patent Document

[Patent document] Japanese Patent Publication No. 2813765

The invention claimed is:
1. A gas container valve fastening machine comprising:
a base;
a column erected on the base, the column having a side surface;
a clamp unit configured to securely support a gas container placed on the base in an upright posture parallel to the column;
a guide rod arranged parallel to the column, the guide rod having a circumference;
a movable frame comprising:
a first side;
a second side opposite the first side; and
a middle portion between the first side and the second side,
wherein the middle portion is attached to the guide rod, the attachment of the middle portion to the guide rod configured to allow the movable frame to move in an axial direction of the guide rod and configured to allow the movable frame to rotate about the circumference of the guide rod via a bearing boss;
a rotary drive unit secured to the first side of the movable frame and disposed above the clamp unit, the rotary drive unit having an output shaft;
a rotary transmission unit having a lower end and an upper end, the upper end interlocked and connected to the output shaft of the rotary drive unit;
a wrench attached to the lower end of the rotary transmission unit, the wrench configured to engage a valve and thread the valve into a screw hole of a sleeve of a gas container on the base; and
a load cell attached to the second side of the movable frame, the load cell configured to detect fastening torque of the wrench and operate in the direction of being pressed against the side surface of the column, the load cell comprising:
an upper side;
a lower side;
a first fastening reaction force receiving roller disposed at the upper side;
a second fastening reaction force receiving roller disposed at the lower side; and
a load housing installed via the first and second reaction force receiving rollers,
wherein the second end of the movable frame includes two arms disposed on opposite sides of the column, wherein the load cell is fixed at the end of one of the two arms, and wherein a screw loosening reaction force receiving roller is installed at the end of the other arm of the two arms.

* * * * *